United States Patent
Faus et al.

(10) Patent No.: US 7,275,462 B2
(45) Date of Patent: Oct. 2, 2007

(54) TENSIONING DEVICE FOR PRESTRESSING A ROD, AND RELATED TENSIONING METHOD

(75) Inventors: José Faus, Paris (FR); Jean-Michel Monville, Ermont (FR)

(73) Assignee: Aktiebolaget SKF, Göteborg (SE)

( * ) Notice: Subject to any disclaimer, the term of this patent is extended or adjusted under 35 U.S.C. 154(b) by 292 days.

(21) Appl. No.: 11/017,414

(22) Filed: Dec. 20, 2004

(65) Prior Publication Data

US 2005/0165397 A1    Jul. 28, 2005

Related U.S. Application Data

(63) Continuation of application No. PCT/FR2003/001845, filed on Jun. 18, 2003.

(30) Foreign Application Priority Data

Jun. 20, 2002   (FR) ................... 02 07654

(51) Int. Cl.
*B25B 29/02*     (2006.01)
*E21B 19/00*    (2006.01)

(52) U.S. Cl. .................. 81/57.38; 254/29 A
(58) Field of Classification Search .............. 81/57.38; 29/452; 254/29 A
See application file for complete search history.

(56) References Cited

U.S. PATENT DOCUMENTS 3,008,362 A * 11/1961 Tucker, Jr. .................. 81/57.38
3,965,565 A *  6/1976 Fujii .......................... 29/446
4,020,720 A *  5/1977 Fujii .......................... 81/57.38
4,029,186 A    6/1977 De Gennes
4,046,238 A    9/1977 Mendoza-Orozco
4,175,453 A * 11/1979 Exner et al. ................ 81/57.38

(Continued)

FOREIGN PATENT DOCUMENTS

DE         4228899          3/1994

(Continued)

OTHER PUBLICATIONS

U.S. Appl. No. 10/520,384, filed Jan. 3, 2005, entitled "Instrumented Antifriction Bearing and Electrical Motor Equipped Therewith" to Gallion et al., available in private Pair.
U.S. Appl. No. 10/548,866, filed Sep. 9, 2005, entitled "Sensor Unit, and Housing Relay for the Production of said unit" to Landrieve, available in private Pair.

(Continued)

*Primary Examiner*—David B. Thomas
(74) *Attorney, Agent, or Firm*—Meyerstons, Hood, Kivlin, Kowert & Goetzel, P.C.; Eric B. Meyertons (57) ABSTRACT

The invention relates to a device for tensioning a threaded rod (1). The inventive device comprises: an actuator (5) which can exert an axial force; and a tie rod (6) which transmits the axial force from the actuator (5) towards a threaded end (1b) of the rod (1b), said tie rod (6) comprising at least two jaws (31) which can move radially between a closed position, in which the tie rod (6) is engaged with a threaded end (1b) of the rod (1), and an open position in which the jaws (31) are disengaged from the threaded rod (1b). Moreover, said device comprises a locking element (45) which can move between a jaw (31) opening position and a jaw (31) closing position.

13 Claims, 5 Drawing Sheets

U.S. PATENT DOCUMENTS

| | | | |
|---|---|---|---|
| 4,319,220 A | | 3/1982 | Pappas et al. |
| 4,438,901 A | * | 3/1984 | Reneau et al. ............ 254/29 A |
| 4,478,595 A | | 10/1984 | Hayakawa et al. |
| 4,523,742 A | * | 6/1985 | Reneau ...................... 254/29 A |
| 4,601,374 A | | 7/1986 | Ladin |
| 4,608,741 A | | 9/1986 | Mallet |
| 4,641,523 A | | 2/1987 | Andreasson |
| 4,699,530 A | | 10/1987 | Satoh et al. |
| 4,708,036 A | * | 11/1987 | Vossbrinck ................. 81/57.38 |
| 4,815,867 A | | 3/1989 | Ladin |
| 4,854,436 A | | 8/1989 | Lassiaz et al. |
| 4,872,768 A | | 10/1989 | Brandenstein et al. |
| 4,874,073 A | | 10/1989 | Tagawa |
| 4,881,629 A | | 11/1989 | Gay et al. |
| 4,946,295 A | | 8/1990 | Hajzler |
| 4,957,133 A | | 9/1990 | Linz et al. |
| 4,998,453 A | * | 3/1991 | Walton et al. .............. 81/57.38 |
| 5,008,647 A | | 4/1991 | Brunt et al. |
| 5,018,384 A | | 5/1991 | Hayashi et al. |
| 5,033,013 A | | 7/1991 | Kato et al. |
| 5,264,790 A | | 11/1993 | Moretti et al. |
| 5,372,435 A | | 12/1994 | Genero et al. |
| 5,570,871 A | * | 11/1996 | Westerfeld ................. 254/29 A |
| 5,575,568 A | | 11/1996 | Rigaux et al. |
| 5,592,401 A | | 1/1997 | Kramer |
| 5,598,913 A | | 2/1997 | Monahan et al. |
| 5,713,577 A | | 2/1998 | Lannert et al. |
| 5,721,539 A | | 2/1998 | Goetzl |
| 5,780,731 A | | 7/1998 | Matsui et al. |
| 5,845,230 A | | 12/1998 | Lamberson |
| 5,865,288 A | | 2/1999 | Thomire et al. |
| 5,877,431 A | | 3/1999 | Hirano |
| 6,011,491 A | | 1/2000 | Goetzl |
| 6,013,007 A | | 1/2000 | Root et al. |
| 6,035,990 A | | 3/2000 | Peschke |
| 6,043,643 A | | 3/2000 | Message et al. |
| 6,056,446 A | | 5/2000 | Welter et al. |
| 6,065,737 A | * | 5/2000 | Richardson et al. ....... 254/29 A |
| 6,109,624 A | | 8/2000 | Message et al. |
| 6,160,480 A | | 12/2000 | Su-yueh |
| 6,196,552 B1 | | 3/2001 | Peterson et al. |
| 6,267,512 B1 | | 7/2001 | Beghini et al. |
| 6,323,640 B1 | | 11/2001 | Forestiero et al. |
| 6,338,576 B1 | | 1/2002 | Girardin et al. |
| 6,415,900 B1 | | 7/2002 | Lopez et al. |
| 6,539,336 B1 | | 3/2003 | Vock et al. |
| 6,611,138 B2 | | 8/2003 | Vasiloiu |
| 6,612,749 B2 | | 9/2003 | Arnault et al. |
| 6,666,784 B1 | | 12/2003 | Iwamoto et al. |
| 6,908,229 B2 | | 6/2005 | Landrieve et al. |
| 2003/0007631 A1 | | 1/2003 | Bolognesi et al. |
| 2004/0013334 A1 | | 1/2004 | Landrieve et al. |
| 2004/0141669 A1 | | 7/2004 | Landrieve et al. |
| 2004/0154895 A1 | | 8/2004 | Thomire et al. |
| 2004/0202392 A1 | | 10/2004 | Niarfeix et al. |
| 2005/0008276 A1 | | 1/2005 | Beghini et al. |
| 2005/0011717 A1 | | 1/2005 | Arnault |
| 2005/0011718 A1 | | 1/2005 | Arnault |
| 2005/0089255 A1 | | 4/2005 | Debrailly et al. |
| 2005/0124447 A1 | | 6/2005 | Message et al. |
| 2005/0165397 A1 | | 7/2005 | Faus et al. |
| 2005/0235513 A1 | | 10/2005 | Niarfeix |
| 2005/0265646 A1 | | 12/2005 | Arnault |
| 2006/0011445 A1 | | 1/2006 | Bussit et al. |

FOREIGN PATENT DOCUMENTS

| | | |
|---|---|---|
| DE | 9418459 | 2/1995 |
| DE | 29708535 | 8/1997 |
| DE | 19637585 | 3/1998 |
| DE | 19809074 | 1/1999 |
| DE | 10049505 | 5/2001 |
| DE | 10011820 | 9/2001 |
| DE | 10148388 | 4/2003 |
| EP | 399855 | 11/1990 |
| EP | 0464404 | 1/1992 |
| EP | 0 511 105 | 10/1992 |
| EP | 511105 | 10/1992 |
| EP | 520853 | 12/1992 |
| EP | 806581 | 11/1997 |
| EP | 823267 | 2/1998 |
| EP | 930505 | 7/1999 |
| EP | 0 992 797 | 4/2000 |
| EP | 992797 | 4/2000 |
| EP | 1146244 | 10/2001 |
| EP | 1158287 | 11/2001 |
| FR | 2 375 484 | 12/1977 |
| FR | 2577291 | 8/1986 |
| FR | 2602872 | 2/1988 |
| FR | 2611244 | 8/1988 |
| FR | 2624577 | 6/1989 |
| FR | 2655735 | 6/1991 |
| FR | 2688560 | 9/1993 |
| FR | 2744506 | 8/1997 |
| FR | 2772444 | 6/1999 |
| FR | 2819864 | 7/2002 |
| GB | 1580402 | 12/1980 |
| GB | 2054084 | 2/1981 |
| GB | 2156082 | 10/1985 |
| GB | 2201745 | 9/1988 |
| JP | 62-278352 | 12/1987 |
| JP | 63-172052 | 7/1988 |
| WO | 9850709 | 11/1998 |
| WO | 0000756 | 1/2000 |
| WO | 0142809 | 5/2001 |
| WO | 02055280 | 7/2002 |
| WO | 03042577 | 5/2003 |
| WO | 04005937 | 1/2004 |

OTHER PUBLICATIONS

U.S. Appl. No. 10/551,167, filed Sep. 27, 2005, entitled "Portable Measuring Device for use in Sport" to Franck, available in private Pair.

U.S. Appl. No. 10/552,375, filed Jan. 18, 2005, entitled "Freewheel Bearing Device and Freewheel Pulley" to Girardin, available in private Pair.

U.S. Appl. No. 10/562,476, filed Dec. 21, 2005, entitled "Bearing Support with an Instrumented Movement and Coder for an Information Recorder Unit" to Gallion et al., available in private Pair.

English translation of DE 10011820 (1 page).
English translation of DE 10042677 (1 page).
English translation of DE 10148388 (1 page).
English translation of DE 19637585 (1 page).
English translation of DE 29708535 (1 page).
English translation of EP 399855 (1 page).
English translation of EP 511105 (1 page).
English translation of EP 520853 (1 page).
English translation of EP 823267 (1 page).
English translation of FR 2577291 (1 page).
English translation of FR 2602872 (1 page).
English translation of FR 2611244 (1 page).
English translation of FR 2655735 (1 page).
English translation of FR 2688560 (1 page).
English translation of FR 2772444 (1 page).
English translation of FR 2819864 (1 page).
Patent Abstracts of Japan, vol. 12, No. 437 (M-765), Nov. 17, 1988, 1 page. (Translated abstract of JP 63-172052).
Patent Abstracts of Japan, vol. 12, No. 160 (M-697), May 14, 1988, 1 page. (Translated abstract of JP 62-278352).
Preliminary Search Report for FR 0114669, FA 610794, Sep. 2, 2002, 3 pages.

* cited by examiner

FIG_1

FIG_2

FIG_3

FIG_4

FIG_5

TENSIONING DEVICE FOR PRESTRESSING A ROD, AND RELATED TENSIONING METHOD

PRIORITY CLAIM

This application is a continuation application of PCT Patent Application No. PCT/FR2003/001845 which claims priority to French Patent Application No. FR 02/07654 filed on Jun. 20, 2002.

BACKGROUND OF THE INVENTION

1. Field of the Invention

The present invention relates to a device for tensioning a rod before locking it, for example with the aid of a nut, particularly for prestressing threaded rods used for fastening mechanical parts to one another.

2. Description of the Relevant Art

Fastening rods can be tensioned by applying a clamping torque to nuts bearing axially on the parts to be assembled. Because of the friction at the face of the nut in contact with an assembled part and at the mating nut/rod threads, this clamping method does not make it possible to control with precision the axial prestressing force on the rod. Furthermore, this clamping method introduces residual torsional stresses in the threaded rod, which leads to the precautionary measure of using oversized threaded rods. Moreover, such a clamping operation leads most often to a relatively high degree of damage not only to the threads of the nut and to those of the threaded rod cooperating therewith while being tightened but also to the surface of the part against which the nut will bear as it is being turned during the clamping operation.

To avoid these disadvantages, it is possible to axially tension a threaded rod before tightening down a clamping nut onto a bearing surface. The clamping nut locks the rod when a tensioning force is released from the rod. The rod is prestressed only along its axis.

In order to exert tension on the rod, use may be made of an actuator or tensioner. Thus, after fitting the nut for clamping the assembly to the end of the rod to be prestressed, the end of the rod together with the nut is covered with the actuator. A puller in the form of a nut in the form of a draw nut is then screwed on to apply a tensile force developed by the actuator. Finally, while the rod is held in tension, the nut of the assembly is tightened down so as to bring it into contact with the part to be assembled, and the tension exerted by the actuator on the rod is released, this rod being locked by the nut of the assembly.

Often, mechanical assemblies must be held together by a number of threaded rods. The use of such pulling devices, especially when the number of threaded rods is high, entails multiple screwing and unscrewing operations for the pullers, making the assembly operations tiresome. Furthermore, the conditions under which the pulling devices are used may be difficult, which makes their use by an operator more testing still.

Document GB 2 201 745 discloses a device for tensioning a threaded rod comprising a pair of radially movable jaws arranged in a conical sleeve. A clasp nut is provided for locking the rod by bearing against a plate. A piston-cylinder assembly is arranged axially between the sleeve and the clasp nut. The piston is designed to push the sleeve axially on the side remote from the nut. An axial movement of the conical sleeve brings the jaws together radially so that they come into engagement with the threaded rod.

This device makes it necessary for the threaded rod to be formed with a free end of considerable length, corresponding to the length of the clasp nut incremented by the length of the piston-cylinder assembly and the jaws, so as to allow the jaws to come into engagement with the threaded rod.

Moreover, the jaws come into engagement with the threaded rod with a combined radial and axial movement during the application of an axial tensioning force. There is a risk that the crests of the threads of the threaded rod will bear against the crests of the threads of the jaws and become damaged.

In addition, the jaws come into engagement with the threaded rod only when an axial tensioning force is applied. Poor cooperation between the jaws and the threaded rod will not be detected prior to the application of an axial force by the piston. An operator must be able to be assured that each tensioning device is properly installed and that a puller will be able to transmit the forces satisfactorily, prior to tensioning a set of rods.

In certain devices, elements are fastened together with the aid of a large number of threaded rods and nuts. The tensioning devices are installed by operators, sometimes under difficult conditions which deprive the operators of total freedom of movement. It is necessary to facilitate the installation of each tensioning device.

SUMMARY

The present invention relates to a tensioning device which can be installed easily by an operator and ensures that the tensioning device is properly installed prior to tensioning a threaded rod for fastening a mechanical assembly.

The invention also relates to a tensioning device allowing easy installation and rapid implementation thereof, particularly for facilitating the application of a prestressing tension simultaneously to a large number of threaded rods.

The invention also relates to a tensioning device making it possible to limit a free end of a threaded rod to a length necessary for installing the tensioning device.

Such a device for tensioning a threaded rod comprises an actuator capable of exerting an axial force, a puller for transmitting an axial force from the actuator toward a threaded end of the rod, the puller comprising at least two jaws which can move between a closed position in which the puller is in engagement with a threaded end of a rod, and an open position in which the jaws are disengaged from the threaded rod. According to one aspect of the invention, the device comprises a lock which can move between a stable position for opening the jaws and a stable position for closing the jaws.

The puller comprising jaws which can move between a closed position and an open position makes it possible to rapidly lock the device for pulling the threaded rod while at the same dispensing with the operation of screwing the puller onto the end of the threaded rod, which operation has to be performed manually and is therefore time-consuming. The locking element can be actuated axially, easily and rapidly, to close or open the jaws. The locking element makes it possible to keep the jaws in an open position or in a closed position. The locking element keeping the jaws in an open position makes it possible to fix the clamping device prior to positioning the jaws in engagement with a threaded end of a rod. During the installation of the tensioning device, the jaws kept open will not interfere with the thread of the rod, with the result that the device can be easily installed without resistance, something which is beneficial for an operator. To make the jaws close, an operator will simply have to position the locking element axially without needing to rotate the jaws or the actuator in any sort of way. The operator is assured that the jaws are in engagement with the rod. This operation is carried out independently of the application of an axial tensioning force on the rod.

In one embodiment, the locking element comprises surfaces for separating the jaws intended to bear against corresponding surfaces of the jaws, the separating surfaces of the locking element being substantially perpendicular to a direction of separation of the jaws. Bearing surfaces perpendicular to a direction of displacement of the jaws make it possible to prevent displacement of the locking element when the jaws are urged into the closing position, as could occur with inclined surfaces. The opening position for the jaws is stable. Advantageously, the jaws can move essentially in a radial direction.

In one embodiment, the locking element comprises a sleeve sliding between the jaws and provided, over an axial segment of the sleeve, with bulges for separating the jaws. When the locking element is slid so that the segment provided with the bulges is introduced between the jaws and thereby separates them, the jaws are in an open position allowing the end of a threaded rod to be inserted between the jaws. When the locking element is slid so that the segment provided with bulges is disengaged from between the jaws, the jaws can be brought into a closed position in which they are in engagement with the threaded end of a rod.

In one embodiment, the jaws are urged into the closed position by an elastic element. When the locking element is placed in the closing position, a closing movement of the jaws is no longer prevented by the locking element. This closing movement is caused by the elastic element. With such a design, the jaws tend to return to the closed position, which ensures the reliability of the pulling device by preventing the jaws from remaining locked in the open position. The elastic element may consist of springs arranged between the jaws or of an elastic ring surrounding the jaws, both of which means tend to bring the jaws toward one another.

Advantageously, the jaws are mounted in an axially floating manner with the aid of springs. Providing the jaws with a freedom of axial displacement makes it possible to adjust the position of the jaws so that a threaded pulling portion of the jaws suitably cooperates with the thread of the rod.

In one embodiment, the actuator comprises a moving member provided with a latching portion having an inclined surface for contact with the jaws provided with corresponding surfaces. Thus, the moving member can exert an additional clamping force on the jaws when an axial tensioning force is exerted. The clamping force increases with the tensioning force.

Advantageously, the latching portion of the moving member is offset axially with respect to a force take-up portion and is intended to cooperate with a pulling portion of the jaws situated at one of the jaws. The offset latching portion makes it possible to act on a pulling portion of the puller in engagement with the threaded rod in the vicinity of a clamping nut. The length of a free end of the threaded rod is limited. Consequently, since the threaded rod is shorter, the duration of an operation for screwing a clamping or locking nut onto the end of the threaded rod is limited. Moreover, axial deformation of the puller is prevented. The offset latching portion also makes it possible to preserve an inner space of the piston to allow radial separation of the jaws.

In one embodiment, the puller comprises at least one guide for radially separating the jaws which slides simultaneously in drilled holes made in two jaws.

The invention also relates to an assembly for tensioning threaded rods, characterized in that it comprises a support plate bearing at least two tensioning devices according to one aspect of the invention, and a locking plate for acting simultaneously on all the locking elements of the tensioning devices.

The invention also relates to a method of tensioning a threaded rod, in which jaws of a puller are kept separated with the aid of a locking element, the jaws are released by acting on the locking element so that they close over one end of the rod, and then an axial tensioning force is exerted on the threaded rod with the aid of an actuator acting on the puller.

BRIEF DESCRIPTION OF THE DRAWINGS

The present invention and its advantages will be better understood on studying the detailed description of an embodiment given by way of non-limiting example and illustrated by the appended drawings, in which.

DETAILED DESCRIPTION OF EMBODIMENTS

Figure 1:
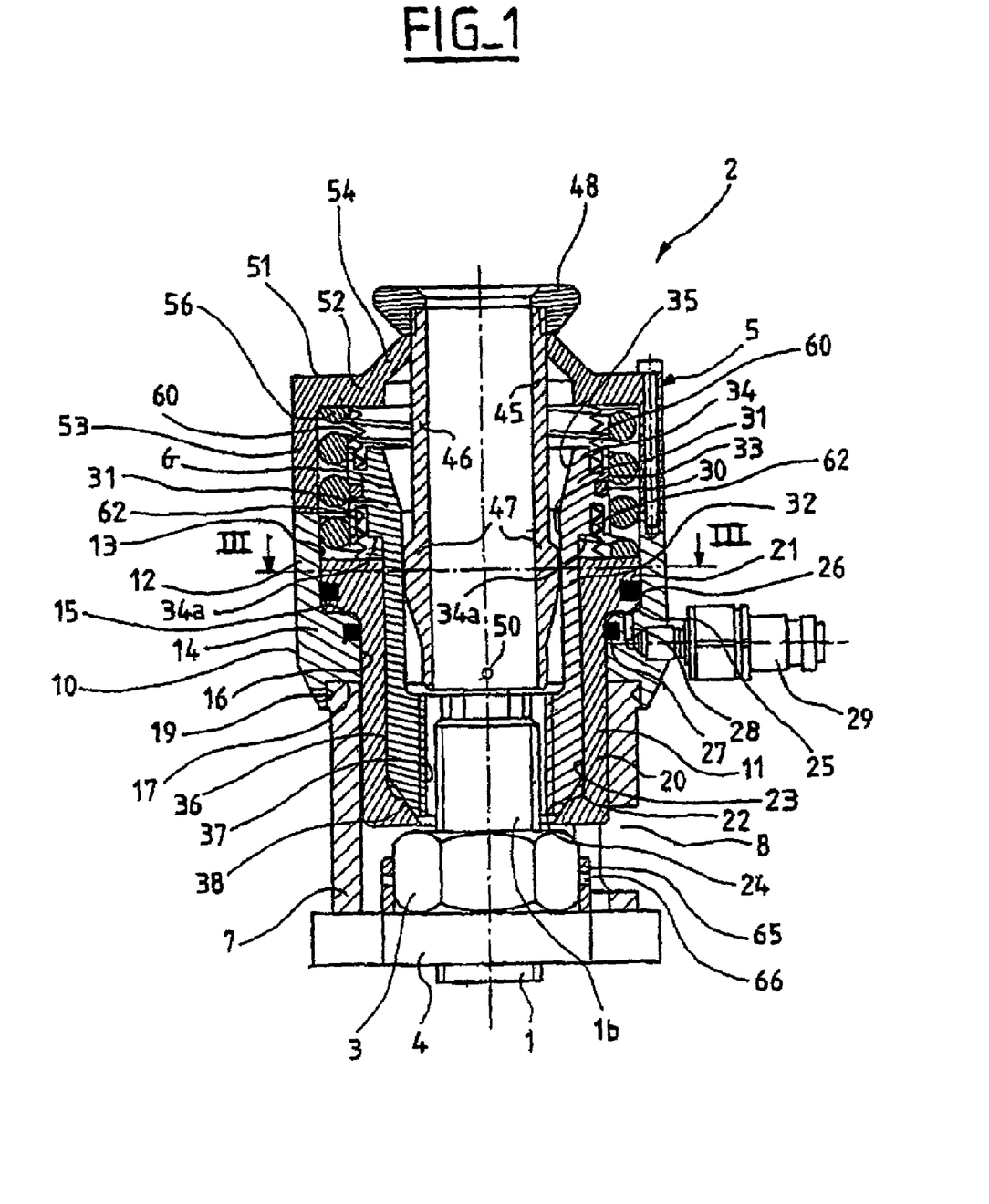
FIG. 1 is a view in axial section of a tensioning device according to the invention, with the jaws in an open position.

In FIG. 1, a threaded rod 1 is intended to be prestressed axially with the aid of a tensioning device referenced 2 in its entirety by being subsequently locked by a nut 3 bearing against a surface of a structure to be clamped, represented here in the form of a plate 4.

The tensioning device 2 comprises an actuator 5 capable of exerting an axial tensile force transmitted to an end 1b of the threaded rod 1 by means of a puller 6. The actuator 5 bears against the plate 4 by way of a tubular skirt 7 which surrounds the end of the rod 1 and is provided with an opening 8 for tightening down the nut 3 against the plate 4.

A tightening wrench 64 is provided on the nut 3 so as to be able to pivot the latter in order to tighten it down against the plate 4 through the opening 8 when the tensioning device is covering the end of the threaded rod. The tightening wrench 64 surrounds the nut 3 and comprises inner surfaces corresponding with the outer surfaces of the nut 3. In a conventional manner, the wrench 64 comprises a hexagonal central hole. The wrench 64 further comprises axial holes situated axially halfway up and intended for inserting a handle (not shown) in order to turn the wrench 64, and therefore the nut 3.

The actuator 5 comprises a cylinder 10 and a piston 11 which slides in the cylinder 10 and forms an annular chamber with the cylinder 10. The cylinder 10 has the general shape of an annular dish, comprising an axial portion 12 having a bore 13, and a base 14 in the form of a radial portion extending inwardly from one end of the axial portion 12, forming a radial shoulder 15 directed toward the opposite end of the axial portion 12. The base 14 has a bore 16.

On the side remote from the shoulder 15, the base 14 comprises a radial bearing surface 17 in contact with an end of the bearing skirt 7 remote from the plate 4. The cylinder 10 comprises a circumferential axial centering rib 19 extending from a larger-diameter region of the base 14 on the side remote from the axial portion 12 and surrounding the end of the bearing skirt 7 in order to retain the cylinder 10 radially on the skirt 7 while centering the cylinder 10 on the skirt 7.

The piston 11 of generally annular shape comprises a tubular portion 20, a collar 21 extending radially outward from one end of the tubular portion 20, and a radial latching portion 22 extending radially inward from an end of the tubular portion 20 remote from the collar 21. The tubular portion 20 has a bore 23. The free inner edge of the latching portion 22 has a frustoconical surface 24 oriented radially inwardly and progressively widening out toward the collar 21.

The tubular portion 20 is fitted into the bore 16 of the base 14 of the cylinder 10. The collar 21 is fitted onto the inner cylindrical bearing surface 13 of the cylindrical axial portion 12 of the cylinder 10. An annular chamber 25 is formed axially between the collar 21 of the piston 11 and the radial surface 15 of the base 14 of the cylinder 10, and radially between the axial portion 12 of the cylinder 10 and the tubular portion 20 of the piston 11. The collar 21 has an outer surface comprising an annular groove in which is housed a seal 26 in frictional contact with the bore 13 of the axial portion 12 of the cylinder 10. The base 14 comprises an annular groove formed over its bore 16 and in which is arranged a seal 27 in frictional contact with the outer surface of the cylindrical portion 20 of the piston 11. The seals 27 and 26 ensure that the annular chamber 25 is sealed.

The actuator 5 comprises pressurized-fluid supply means partly represented in FIG. 1. An inlet 28 is formed in the base 14 of the cylinder 10, opening on one side into the annular chamber 25 at the radial surface 15 and, at the opposite side, to the outside. A hydraulic connector 29 is fastened to the outside of the cylinder 10 in order to supply the inlet 28 with pressurized fluid.

The puller 6 comprises two identical movable jaws 31 urged into the closed position by an elastic element in the form of an open ring 30.

A jaw 31 takes the form of an angular portion of a body of revolution delimited by radial planes, said body of revolution comprising a tubular intermediate portion 32 having a cylindrical inner surface 33, a guiding and force take-up portion 34 situated at one end of the tubular portion 32, having an outside diameter greater than the diameter of the tubular portion 32 and forming a radial shoulder 34a between the outer surface of the guiding and force take-up portion 34 and the outer surface of the tubular intermediate portion 32, the guiding portion additionally having a widened inner surface 35 extending the inner surface 33 of the intermediate portion 32 and widening out on the side remote from the intermediate portion 32, a portion, and a pulling portion 36 situated on the side of the intermediate portion 32 remote from the guiding portion 34 and having a threaded inner surface 37 and, at its free end, a frustoconical outer surface 38 formed by progressive thinning of the radial thickness of the pulling portion 36 in the direction away from the intermediate portion 32.

Figure 3:
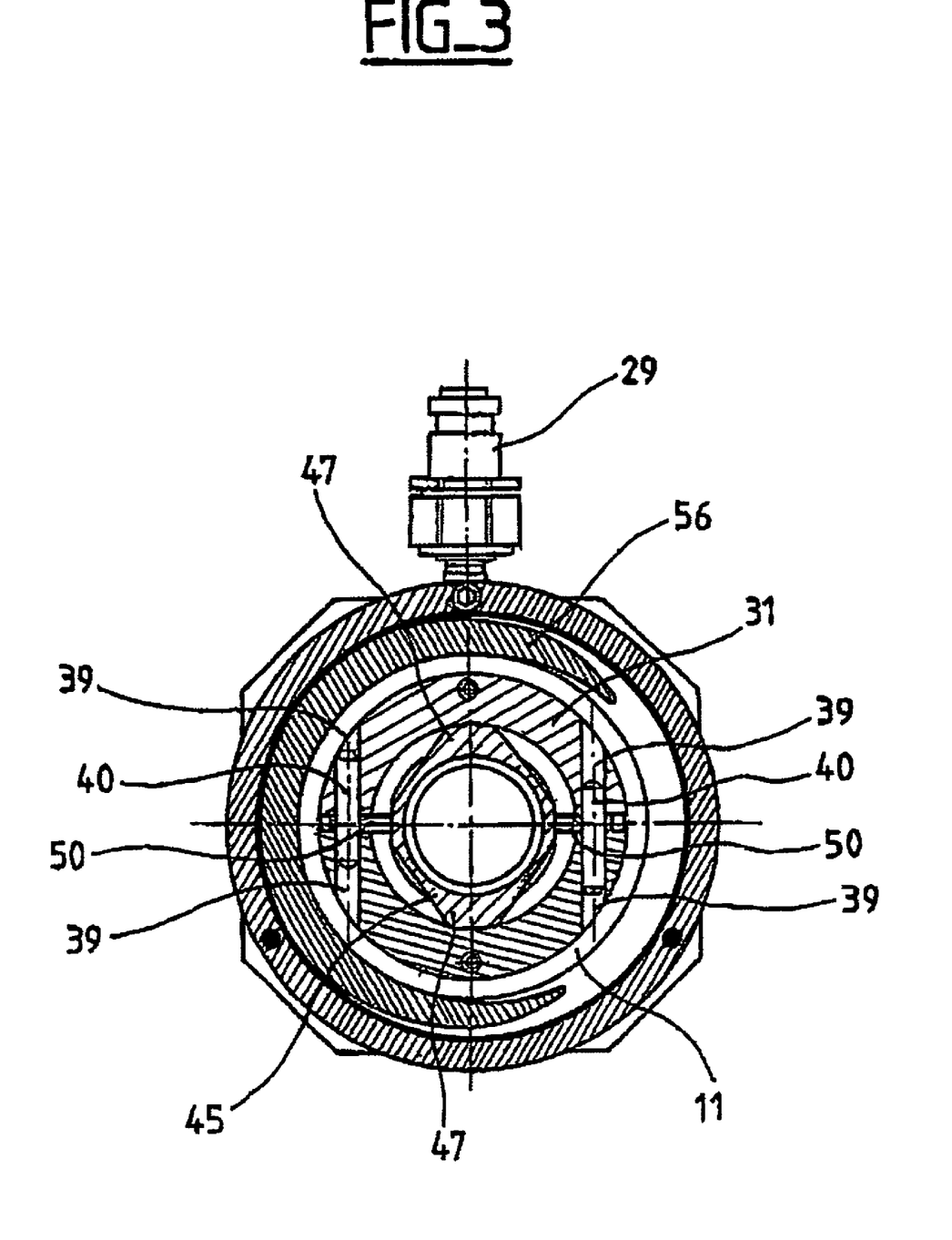
FIG. 3 is a view in radial section of the tensioning device according to FIG. 2 along III-III.

The puller 6 in this case comprises two substantially semi-cylindrical jaws 31, that is say occupying an angular sector substantially equal to 180°, but being slightly less. The jaws 31 are situated one on each side of a radial separation plane. As can be seen more clearly in FIG. 3, the jaws 31 are separated in a radial direction perpendicular to the separation plane so that there is an axial space between adjacent lateral edges of the jaws 31. The portions 34 for guiding the jaws 31 are provided with drilled holes 39 parallel to the direction of separation of the jaws 31 and formed within the thickness of the guiding portions 34. A drilled hole 39 in one jaw 31 comes opposite a drilled hole 39 in the other jaw 31. Guides 40, in the form of pins or pegs, are mounted so that they can slide simultaneously in a drilled hole in one jaw 31 and in the corresponding drilled hole in the other jaw 31, preserving an axial passage between the jaws 31.

Returning to FIG. 1, the open elastic ring 30 surrounds the jaws 31, being deformed in the direction of an opening action. The elastic ring 30 exerts a radial clamping force on the jaws 31. More specifically, the elastic ring 30 is housed in portions of the annular groove made in the outer surfaces of the guiding portions 34 of the jaws 31.

A locking element 45 is intended to be inserted into the axial passage between the jaws 31. The locking element 45 comprises a sleeve 46 provided over an axial intermediate segment with bulges in the form of radially outwardly projecting lobes 47. A lobe 47 comprises a central locking portion having an outer surface oriented away from the sleeve 46 while being substantially parallel to the axis of the locking element 45, that is to say perpendicular to a radial direction, and inclined lateral guiding portions situated axially on either side of the central portion. There are two lobes 47 here and they are diametrically opposed.

The locking element 45 comprises a stop 48 screwed onto one end of the sleeve 46. The locking element 45 also comprises two diametrically opposed studs 50 projecting radially outward from the end of the sleeve 46 remote from the stop 48, these stubs being aligned in a direction perpendicular to the direction of alignment of the lobes 47. On the side remote from the stop 48, an end portion of the sleeve 46 not provided with lobes 47 has an outer cylindrical bearing surface.

The tensioning device 2 comprises a cap 51 of generally annular shape having a radial portion 52 and a cylindrical axial portion 53 extending axially from the region of largest diameter of the radial portion 52. The cap 51 comprises a central portion 54 extending radially inwardly from the inner edge of the radial portion 52 on the side remote from the axial portion 53. The central portion 54 has an opening.

The puller 6 is inserted into the piston 11 of the tensioning actuator 5, the guiding portion 34 being situated axially between the piston 11 and the radial portion 52 of the cap 51. The cap 51 is fastened to the cylinder 10 on the side remote from the base 14. A return spring 56 is arranged between the radial wall 52 of the cap 51 and the collar 21 of the piston 20. The locking element 45 is fitted into the central part 54 of the cap 51 and can slide axially.

The puller 6 is mounted in an axially suspended or floating manner with the aid of suspension springs. First suspension springs 60 are arranged axially between the radial wall 52 of the cap 51 and the guiding portions 34 of the jaws 31. Second suspension springs 62 are arranged axially between the collar 21 of the piston 11 and the guiding portions 34 of the jaws 31.

In the position illustrated by FIG. 1, the tensioning device 2 is positioned against the plate 4 in such a way that the skirt 7 surrounds the threaded rod 1. The nut 3 is screwed onto the rod 1 by being tightened down against the plate 4. The piston 11 of the tensioning actuator is retracted, that is to say that the collar 21 of the piston is in contact with the base 14 of the cylinder 10, which means that the volume of the annular chamber 25 is minimum. The latching portion 22 of the piston 11 is situated axially in the vicinity of the nut 3, surrounding the free end 1b of the threaded rod 1 for fastening the assembly.

The puller 6 is inserted into the piston 11, the free end of the pulling portion 36 provided with a frustoconical outer surface 38 being surrounded by the latching portion of the piston 11.

The locking element 45 is translationally displaced between the jaws 31 in such a way that the central parts of the lobes 47 are inserted between the intermediate portions of the jaws 31, the stop 48 bearing axially against the central part 54 of the cap 51. The spacing between the outer surfaces of the central parts of the lobes 47 is such that the locking element 45 stably maintains the jaws 31 in the separated open position. The studs 50 project between the lateral edges of the jaws 31 so as to prevent rotation of the locking element 45 with respect to the jaws 31, with the result that the lobes 47 are aligned with the direction of separation of the jaws 31 which is defined by the guides 40.

The lobes 47 and the jaws 31 bear mutually by way of surfaces perpendicular to the direction of displacement of the jaws 31, so that the force urging the jaws 31 into the closed position which is exerted by the elastic ring 30 does not cause the locking element 45 to retreat. Once pushed in, the locking element 45 is kept in position, so that an operator is able to manipulate the tensioning device 2 and install it even when his mobility is reduced, as in the case when he has only one hand available to carry out the operations.

The diameter of the piston bore 23 is designed to allow sufficient separation of the jaws 31 so that their threaded ends do not interfere with the threaded end 1b of the rod 1 during the installation of the tensioning device 2, thus facilitating the installation of the tensioning device 2 by an operator.

In the absence of pressurized fluid in the annular chamber 25, the piston 11 is kept in the retracted position by the return spring 56 exerting an axial force on the piston 11 directed toward the plate 4.

Figure 2:
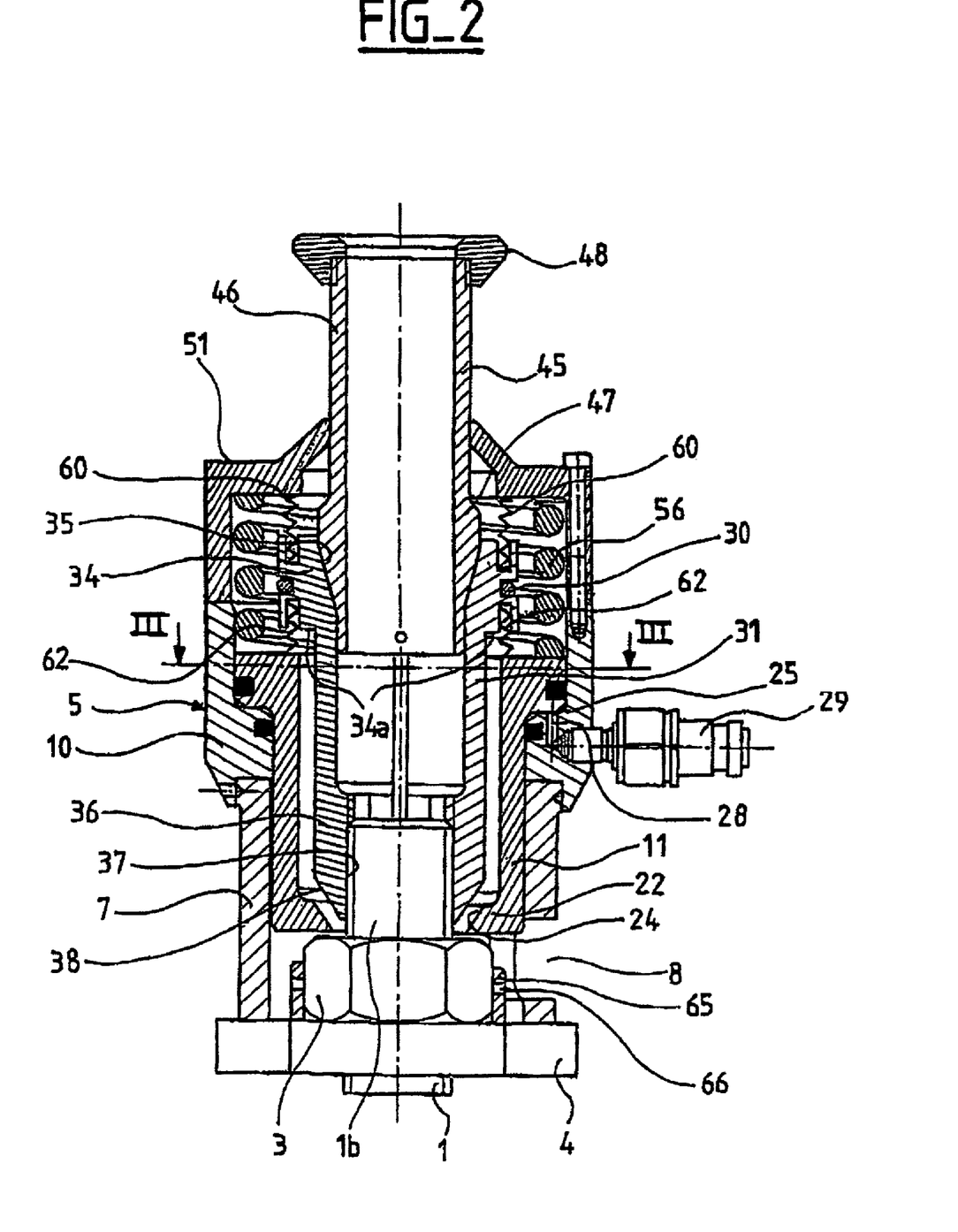
FIG. 2 is a view in axial section of a tensioning device according to FIG. 1, with the jaws in a closed position.

FIG. 2 represents the tensioning device 2 in a position in which the jaws 31 are closed, without the application of an axial tensioning force to the threaded rod 1.

The locking element 45 is pulled axially so that the central portions of the lobes 47 are disengaged from between the intermediate portions 32 of the jaws 31 and no longer prevent the latter from moving radially toward one another.

The jaws 31 are urged into the closed position by the elastic ring 30 which tends to move them toward one another. The jaws 31 move radially toward one another until their latching portions 36 provided with threads 37 come into engagement with the threads of the free end 1b of the threaded rod 1. An end portion of the sleeve 46 of the locking element 45 is situated between the intermediate portions 32 of the jaws 31. The outside diameter of the sleeve 46 is designed to allow the jaws 31 to move sufficiently toward one another. The end portion of the sleeve 46 improves axial guiding of the locking element 45 when repositioning the latter into the position for opening the jaws 31.

In the event that the crests of the threads of the rod 1 are not situated opposite the thread routes of the jaws, the suspension springs 60, 62 allow a slight adaptation of the axial position of the jaws 31 so that, through the effect of the radial urging by the elastic ring 30 and of the inclined surfaces of the threads, the jaws 31 engage suitably in the threads of the threaded rod 1, ensuring satisfactory cooperation and avoiding any risk of damage to the threads which may lead to an incident and sometimes even an accident. The jaws 31 are displaced essentially radially with a possibility of axial displacement.

Advantageously, the suspension springs 60, 62 for the pullers have one end housed in a hole in the guiding portions 34 of the jaws 31 and bear simply against planar surfaces by way of their opposite end. In this way, the suspension springs 60, 62 accompany the jaws 31 in their radial movements. It is not necessary to rotate the jaws 31 of the actuator 5 in whatever way.

Figure 4:
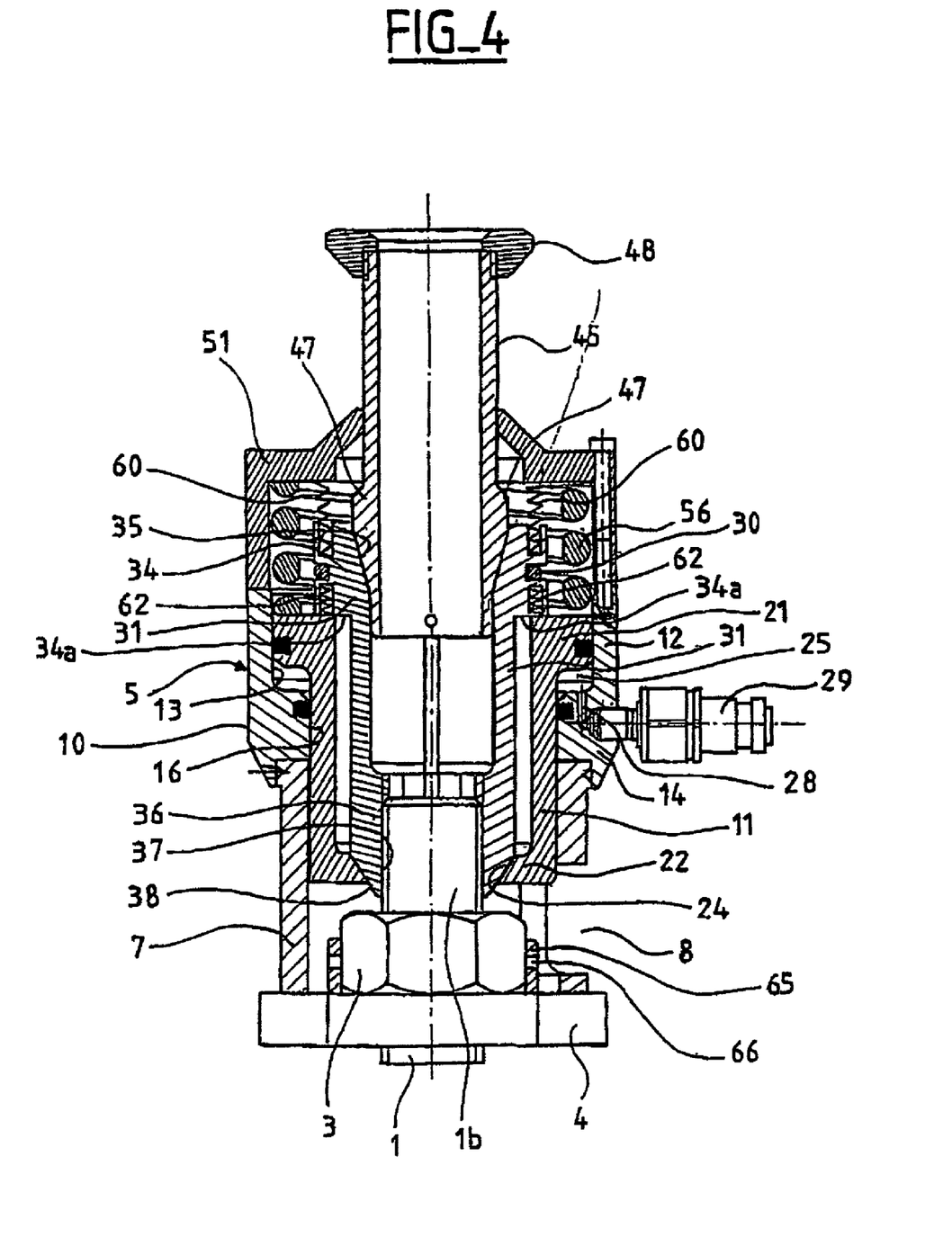
FIG. 4 is a view in axial section of the tensioning device according to FIG. 2 during the application of an axial tensile force to one end of a threaded rod.

FIG. 4 represents the tensioning device 2 during a step in which a tensioning force is applied to the threaded rod 1 after the jaws 31 have been closed.

During a tensioning step, the chamber 25 is supplied with pressurized fluid by way of the inlet 28, which has the effect of exerting an axial force between the cylinder 10 and the piston 11. The piston 11 is pushed axially along the bores 13, 16 of the cylindrical axial portion 12 and of the base 14 of the cylinder 10 on the side of the cylinder 10 remote from the skirt 7. The return spring 56 is compressed. For reasons of clarity of the drawing, the return spring 56 is represented with one less turn. A person skilled in the art will readily understand that, in fact, during compression of the return spring 56, the turns thereof move closer together.

The latching portion 22 of the piston 11 comes into contact by way of its frustoconical surface 24 with the inclined outer end surface 38 of the jaws 31. The piston 11 acting on the jaws 31 by way of an inclined surface 38 transmits, to the jaws 31, an axial tensile force and a radial clamping force on the jaws 31. The greater the axial tensile force is, the greater the clamping force on the jaws will be. In addition, the latching portion 22 is offset axially with respect to the collar 21 of the piston 11, which is a portion for taking up tensile forces applied with the aid of the actuator 5. A clamping force on the jaws 31 applied by the offset latching portion 22 is exerted directly on the portion of the jaws 31 in engagement with the rod 1.

The piston 11 is displaced axially with respect to the puller 6, with the result that the suspension springs 62 situated between the piston 11 and the puller 6 are compressed. The piston 11, sliding slightly with respect to the jaws 31, comes into contact, by way of its end surface of the collar 21 remote from the latching portion 22, with the force take-up shoulder 34a formed on the guiding portion 34. The axial positioning tolerances on the one hand, with respect to the piston, between the collar 21 and the frustoconical surface 24 of the latching portion 22 and on the other hand, with respect to the jaws 31, between the force take-up shoulder 34a and the frustoconical surface 38 are judiciously chosen so that the deformations caused in the piston 11 and in the jaws 31 by the forces are balanced and do not cause any excessive stresses.

The piston 11 comprises a collar 21 forming an annular chamber 25 with the cylinder 10, and an offset latching portion 22 for applying a tensile force as closely as possible to the nut 3. The tensile force is transmitted by the latching portion 22 acting on one end of the puller 6 axially close to the nut 3. The structure of the piston 11 makes it possible to pass the puller 6 through the piston 11 so that it can engage with the threaded rod 1 as closely as possible to the nut 3, thereby avoiding having to provide a free end 1b of the threaded rod 1 with a considerable length.

The inclined parts of the lobes 47 of the locking element 45 and the inclined surface 35 of the guiding portions 34 of the jaws 31 facilitate actuation of the locking element 45 from a closing position toward an opening position. In the opening position, the lobes 47 are situated outside the space contained between the intermediate portions 32 of the jaws 31. On actuating the locking element 45, the inclined portions cooperate with the inclined surfaces 35 of the jaws 31, causing progressive separation of the jaws 31. When the central parts of the lobes 47 are passed between the intermediate portions 32, the locking element 45 is in a stable position for closing the jaws.

The locking element 45 is also stable in the position for closing the jaws 31. Specifically, the inclined surfaces 35 of the guiding portions 34 of the jaws 31, urged radially by the elastic ring 30, exert an axial force on the lobes 47 pushing the locking element 45 into the position for closing the jaws 31.

When the tensile force is being applied to the threaded rod 1, the wrench 64 is maneuvered in order to tighten the nut 3 down onto the plate 4. Next, the tensile force on the threaded rod 1 is released, said rod being locked by the nut 3 bearing against the plate 4, thus maintaining the prestress on the threaded rod 1. Next, the locking element 45 can be pushed in to separate the jaws 31 and remove the tensioning device 2.

A puller 6 comprising two jaws 31 has been described. Of course, it would be possible to provide a puller divided into a greater number of jaws. In that case, provision is made to adapt the locking element so that it has separating surfaces perpendicular to the directions of displacement of the jaws, and suitable guiding means for the jaws.

When a number of rods are to be clamped simultaneously, provision may be made to bring together a plurality of tensioning devices on one and the same support and to equip the assembly with an operating plate for locking the jaws which acts simultaneously on all the locking elements. The operating plate can be actuated by any type of actuator such as, for example a hydraulic, pneumatic or electrical actuator, or an electromagnet device.

Figure 5:
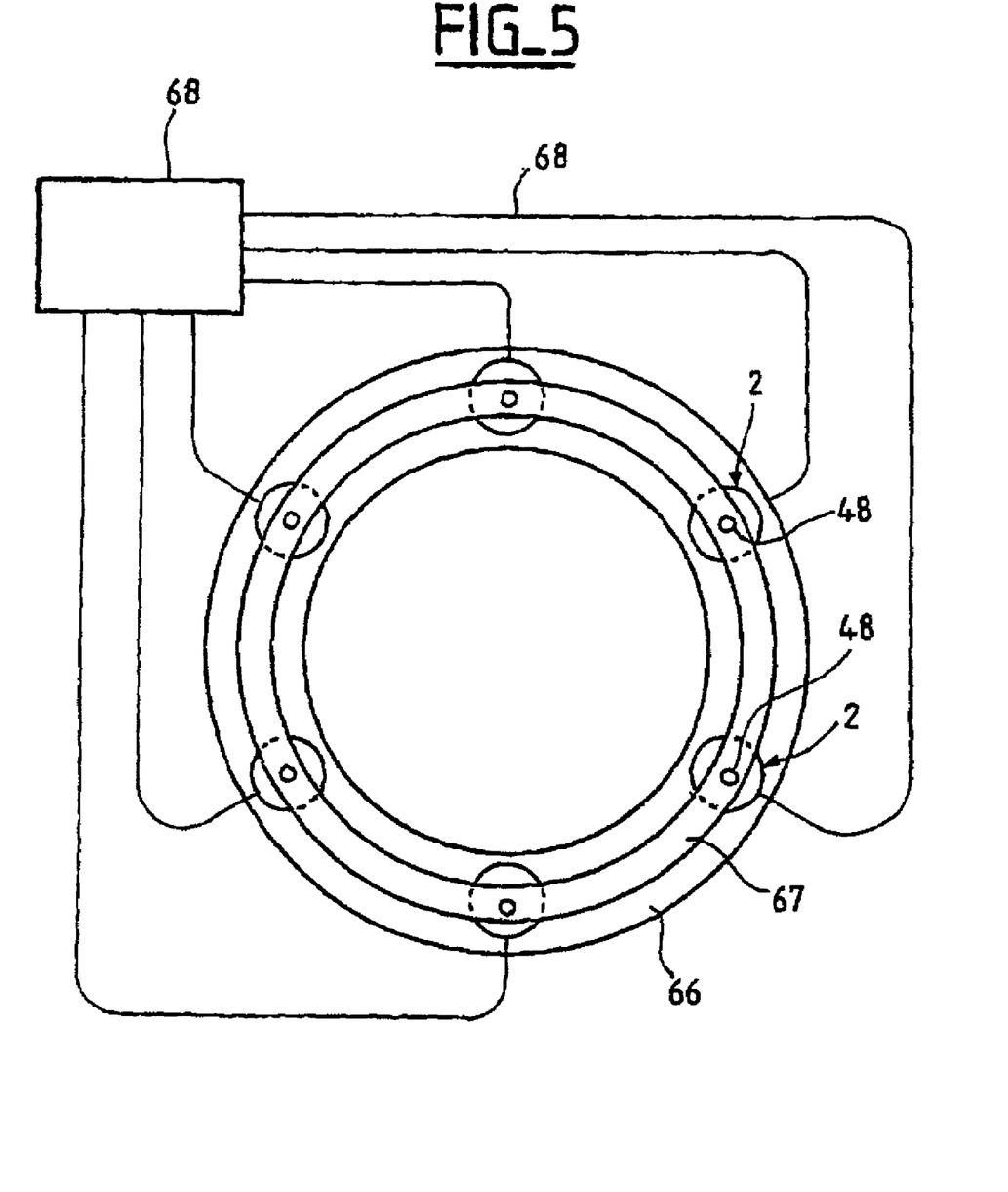
FIG. 5 is a schematic plan view of a tensioning assembly comprising a plurality of tensioning devices according to FIG. 1.

In FIG. 5, an annular support plate 66 bears a plurality of tensioning devices 2, numbering 6 in this case, distributed circumferentially in a regular manner and represented by broken lines. The immobilizers 48 of the locking elements 45 of the tensioning devices 2 are fastened to an annular locking plate 67 whose dimensions are smaller than those of the support plate 66. A hydraulic central unit 68 is connected via lines 69 to the tensioning devices 2.

To apply a prestressing tension to threaded rods, the support plate 66 is arranged in such a way that the tensioning devices cover the free ends of the threaded rods, which will have previously been fitted with tightening nuts. Next, the jaws of the tensioning devices 2 are simultaneously closed by pressing on the locking plate 67 so as to simultaneously push in the locking elements 48. Next, a tension is applied simultaneously to all the threaded rods by operating the hydraulic unit 68 which supplies a pressurized fluid simultaneously into all the tensioning devices. Next, the tightening nuts are tightened down successively on all the threaded rods, and then the tension applied by the tensioning devices is released simultaneously by operating the hydraulic central unit 68.

In a variant, provision is made to tension the threaded rods sequentially by tensioning groups of symmetrically distributed rods.

Moreover, although annular support plates have been described, other forms of support or locking plates may be appropriate and will be chosen according to the distribution of the threaded rods to be prestressed.

The tensioning devices comprising jaws make it possible to apply these jaws simultaneously to all the threaded rods. The locking elements having stable positions for closing and opening the jaws make it possible to open or close the jaws without having to maintain a force. Thus, it is easily possible to install the tensioning devices simultaneously and then to close or open their jaws simultaneously. Furthermore, an operator is freer in his movements if he does not have to maintain a force to open or close the jaws.

By virtue of the invention, a device for tensioning threaded rods which is easy to install and manipulate is obtained. The jaw-type puller permits rapid fastening to the threaded rod, without a screwing operation. The locking element, which can move between stable positions for opening and closing the jaws, facilitates the use of the device by an operator who can successively position the locking element into the opening position, place the tensioning device, and then position the locking element into the closing position, causing the jaws to close through a radial movement and bringing about suitable latching of the threaded rod, thereby preventing damage to the threads. The jaws mounted in a floating manner enable their axial position to be adapted with respect to the threads of the threaded rod. Furthermore, the tensioning device makes it possible to apply a tensile force to a threaded rod having a free end of reduced length.

The invention claimed is:

1. A device for tensioning a threaded rod comprising an actuator capable of exerting an axial tensioning force, a puller for transmitting the axial tensioning force from the actuator toward a threaded end of the rod, the puller comprising at least two jaws which can move between a closed position in which the puller is in engagement with a threaded end of a rod, and an open position in which the jaws are disengaged from the threaded rod, and a locking element which can move between a stable position for opening the jaws and a stable position for closing the jaws, wherein the locking element comprises a sleeve sliding axially between the jaws and provided, over an axial segment of the sleeve, with bulges for separating the jaws.

2. The device as claimed in claim 1, wherein the separating bulges of the locking element comprise surfaces for separating the jaws intended to bear against corresponding surfaces of the jaws, said separating surfaces being substantially perpendicular to a direction of separation of the jaws.

3. The device as claimed in either one of claim 1 or 2, wherein the bulges have central locking portions having an outer surface perpendicular to a direction of separation of the jaws, and at least one inclined lateral guiding portion.

4. The device as claimed in claim 3, wherein the jaws have, at one end, inclined inner surfaces capable of cooperating with an inclined lateral guiding portion of the locking element bulges.

5. The device as claimed in claim 1, characterized in that the jaws can move essentially in a radial direction.

6. The device as claimed in claim 1, wherein the jaws are urged into the closed position by an elastic element.

7. The device as claimed in claim 1, wherein the jaws are mounted in an axially floating manner with the aid of springs.

8. The device as claimed in claim 1, wherein the actuator comprises a moving member provided with a latching portion having an inclined surface for contact with the jaws, which are provided with corresponding surfaces.

9. The device as claimed in claim 8, wherein the actuator is of the piston type, the moving member comprising a force take-up portion capable of forming a piston in the actuator.

10. The device as claimed in claim 9, wherein the latching portion of the moving member is offset axially with respect to the force take-up portion, the latching portion being intended to cooperate with a pulling portion of the jaws situated at one end of the jaws.

11. The device as claimed in claim 1, wherein the puller comprises at least one guide for radially separating the jaws which slides simultaneously in drilled holes made in two jaws.

12. An assembly for tensioning threaded rods, comprising a support plate bearing at least two tensioning devices as claimed in claim 1, and a locking plate for acting simultaneously on all the locking elements of the tensioning devices.

13. A method of tensioning a threaded rod, wherein jaws of a puller are kept separated with the aid of a locking element displaced axially between the jaws and having bulges for separating the jaws, the jaws are released by axially sliding the locking element so that the jaws close over one end of the rod, and then an axial tensioning force is exerted on the threaded rod with the aid of an actuator acting on the puller.

* * * * *